Patented Dec. 14, 1937

2,102,103

UNITED STATES PATENT OFFICE 2,102,103

PROCESS FOR RECOVERING ACIDS

Oliver M. Urbain and William R. Stemen, Columbus, Ohio, assignors to Charles H. Lewis, Harpster, Ohio No Drawing. Application February 16, 1935, Serial No. 6,919

10 Claims. (Cl. 260—122)

This invention relates to a process for the recovery of bound acids by acid exchange.

The invention contemplates a process for the exchange of anions employing what we have termed "onium salts" as the medium through which the exchange is accomplished.

More specifically, the invention embraces the use of solid materials of high surface exposure and rich in "onium groups" for the recovery of bound acids by exchange of the negative ion of an "onium group" for the negative ion of the acid salt, or the negative ion of the acid itself.

It has, of course, long been known that certain natural materials are capable of effecting the exchange of cations. This is known as base exchange and the materials acting to effect the exchange are known as zeolites. Anion exchange, on the other hand, has not been regarded as feasible since the anions of a solution do not "hop" around on the surface as do the cations.

We have, however, demonstrated that anion exchange is by the process of the present invention made just as feasible and practical as is the exchange of cations.

The active medium in the anion exchanger employed in the process of the instant invention is an "onium salt". There are many types of onium salts and any onium salt which is very slightly soluble, say less than .01 gram in 100 c. c. of water at 20° C., is suitable for use in the process.

An "onium salt" within the meaning of this specification may be defined as a chemically united "onium" group and a suitable hydrocarbon residue.

The hydrocarbon residue to which the "onium group" is bound must be one that is solid.

An exemplary mode of obtaining a suitable hydrocarbon residue for combining with an "onium group" will be here given.

The hydrocarbon base should have a boiling point range, no point of which is below 235° C. at a pressure of 760 mm. of mercury, and no point of which is higher than 345° C. under a pressure of 15 mm. of mercury. The hydrocarbon base should preferably be of the aliphatic series.

The hydrocarbon base is held at a temperature of 160° C. to 215° C., at which temperature range the base material is a liquid, and chlorine gas is slowly passed into the mass. If the hydrocarbon base contains such unsaturated hydrocarbons as the olefins the chlorine adds to the double bonds of the olefins. The principal reaction is one of substitution, as shown by the vigorous evolution of hydrogen chloride. An inert gas, such as nitrogen or carbon dioxide, may be passed through the mass simultaneously with the chlorine to sweep out the hydrogen chloride as it is formed. Care must be taken to prevent local heating during the chlorination process. Catalysts, such as iodine and the chlorides of iron and nickel, may or may not be employed in carrying out the chlorination of the hydrocarbon base. As the chlorination proceeds, the viscosity of the hydrocarbon mass increases and this phase gives the key to the end point desired. The chlorination is continued until the chlorinated hydrocarbon has a penetration not higher than 275 designation A. S. T. M., D—5—25. The finished product at this point resembles the harder types of asphalt, both as to color and physical appearance. It varies in chlorine content from 6% to 78%. The percentage of chlorine depends upon the choice of hydrocarbons chlorinated and the time and temperature of the chlorination. The chlorinated hydrocarbon is over 27% soluble in ether, benzene, carbon tetrachloride or chloroform.

If desired, the chlorinated hydrocarbon obtained as above may be subjected to gentle pyrolysis at temperatures slightly over 225° C. At such temperatures hydrogen chloride is split off and a coke like residue remains. It contains chemically bound chlorine but its chlorine content is always less than that of the chlorinated hydrocarbon before pyrolysis.

The product obtained as above described represents a suitable hydrocarbon residue for chemically uniting with an "onium group" to form the "onium salt" which is the anion exchange medium employed in the process contemplated by the instant invention.

The "onium groups" which may advantageously be united with the hydrocarbon residue to form "onium salts" of the requisite specifications embrace the following:—

(1) Ammonium type

(2) Phosphonium type

(3) Arsonium type

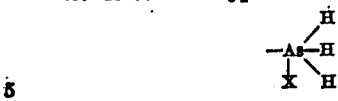

(4) Stibonium type

(5) Sulfonium type

(6) Selenonium type

(7) Oxonium type

(8) Stannonium type

(9) Iodonium type

(In the above X=any acid radical or negative grouping.)

Any of the above groupings or any mixture of the groupings is affixed to the hydrocarbon residue by the free valence indicated at the left of each formula. These groupings are joined directly to the carbon in the hydrocarbon base.

When X is univalent, the structure is as follows:—

For purposes of illustration, we employ X=Cl, and the #1 grouping.

Using #1 grouping and a divalent X, say, SO₄, we have

Using #1 grouping and a trivalent X, say PO₄, we have

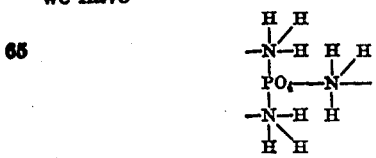

etc.

Any or all of the hydrogen atoms shown bound to the elements N, P, As, Sb, S, Se, O, Sn and I, may be replaced by hydrocarbon radicals or substituted hydrocarbon radicals with or without ring formation.

An example of such substitution with ring formation is shown, as follows:—

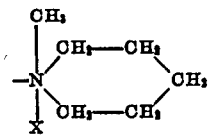

a piperidinium salt.

An example of such substitution without ring formation is shown below:

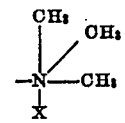

an ammonium salt.

The "onium salts" described in the foregoing pages, are all solids capable of high surface activity. They may be considered as salts, the cation of which imparts to the material its very slight solubility.

We have shown that the "onium salt" anion is made up of two parts, namely,—

1—A hydrocarbon residue.
2—An "onium group."

When the hydrocarbon base is united with an "onium group", we form an "onium salt." The "onium salts" are the exchangers, through the medium of which we can effect the exchange of anions.

Representative examples of anion exchange as effected in accordance with the process are graphically illustrated below:

Let X and X'=any negative group, such as Br, Cl, I, Fl, NO₃, C₆H₅—O, HO, H—S, CH₃COO, HSO₄, SO₄, etc.

Let M=any positive grouping, such as H, Na, K, Li, Ba, etc.

Let R=the hydrocarbon residue to which any "onium group" is bound.

Let R', R'' and R'''=hydrogen or organic radicals, or R and R'=the same hydrocarbon residue, and R'' and R'''=hydrogen or organic radicals. The general reactions, using I the ammonium, II the sulfonium and III the phosphonium type of onium salts, are:

*I.—Ammonium type*

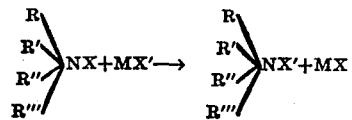

*II.—Sulfonium type*

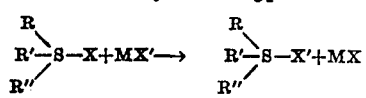

*III.—Phosphonium type*

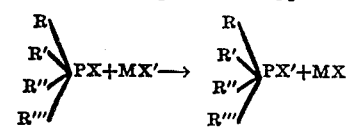

Specific examples of the three general reactions given above, are as follows:—

*I.—Ammonium type*

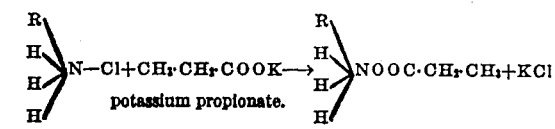

II.—Sulfonium type

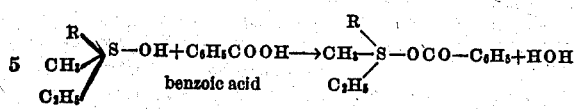

III.—Phosphonium type

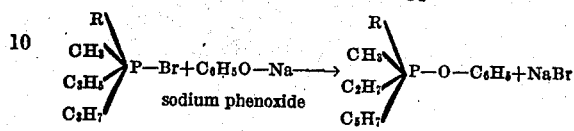

The step of regenerating the exchange medium and recovering in concentrated solution the negative ions exchanged is not difficult. The general regeneration reactions will be given first, followed by the regeneration reactions for the three specific exchanges above, i. e., ammonium type, sulfonium type, and phosphonium type.

I.—Ammonium type

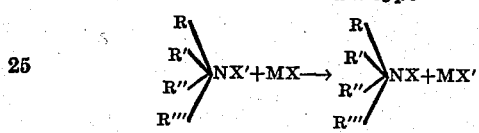

II.—Sulfonium type

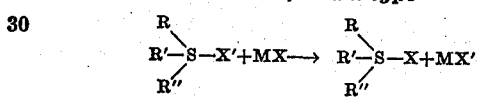

III.—Phosphonium type

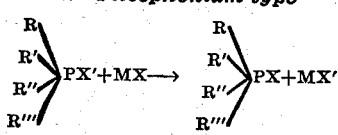

I.—Ammonium type

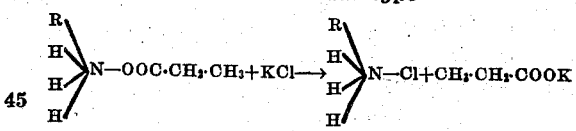

II.—Sulfonium type

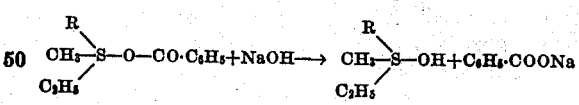

III.—Phosphonium type

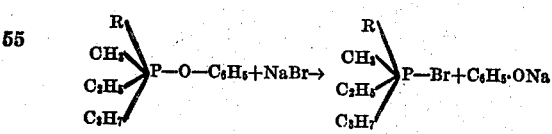

The "onium salt" anion exchanger, when prepared accordingly to the procedure outlined above, is a spongy like mass. The mass may be impregnated on any carrying material which is chemically inert. Such materials as cotton, asbestos, powdered brick (10 mesh), etc., are suitable. A porous or spongy material is best, as such materials have a larger surface.

For purposes of illustration, we may select the recovery of acetic acid as the problem at hand. Say, the solution carrying the acetate contains only 1% thereof. There has heretofore been available no process for the recovery of acetic acid from such a dilute solution, the cost of which is not greater than the value of the recovered acid. By the present process, the recovery of acid from such solutions is a comparatively simple and inexpensive procedure.

The acetate solution is passed slowly through a filter charged with the "onium salt" exchanger. A period of contact of only a few minutes is necessary. If the acetate is in the form of sodium acetate and the exchanger has been regenerated with sodium sulfate, the acetate and the sulfate exchange, the sulfate passing into the effluent as sodium sulfate and the acetate being retained in the exchanger. When the exchanger becomes exhausted, it is washed with a concentrated solution of sodium sulfate, the acetate and sulfate again exchanging places, the acetate passing into the wash and the sulfate into the exchanger. The exchanger is thus regenerated and the acetate concentrated in a very small quantity of wash water.

The acetate is then recovered by acidifying the wash water with phosphoric acid and distilling off the liberated acetic acid. The acetic acid can be recovered by any number of other methods instead of the one given employing phosphoric acid.

The procedure for the recovery of other acids than acetic is of the same general nature.

Having thus described our invention, what we claim is:—

1. A process for recovering acids from aqueous solution comprising effecting exchange of the anions of the acids with the anions of a solid onium compound, said onium compound having a solubility of less than 0.01 gram in 100 cc. of water at 20° C.

2. In a process for recovering acids from aqueous solution, the step of effecting the exchange of the anions of the acids with the anions of solid onium compound having a solubility of less than 0.01 gram in 100 cc. of water at 20° C.

3. A process for recovering acids from aqueous solution comprising effecting the exchange of the anions of the acids with the anions of a solid onium compound by passing the aqueous solution of the acid through a filter charged with the solid onium compound, said onium compound having a solubility of less than 0.01 gram in 100 cc. of water at 20° C.

4. A process for the elimination of objectionable anions from an aqueous solution comprising effecting exchange of the objectionable anions with unobjectionable anions of a solid onium compound, said onium compound having a solubility of less than 0.01 gram in 100 cc. of water at 20° C.

5. A process for recovering anions from aqueous solution and effecting regeneration of the exchange medium, comprising first effecting exchange of anions in aqueous solution with anions of a solid onium compound, said onium compound having a solubility less than 0.01 gram in 100 cc. of water at 20° C., and thereafter regenerating the onium compound by treatment with a different anion and recovering the originally exchanged anions in concentrated solution.

6. A process for recovering acids from aqueous solution comprising effecting exchange of the anions of the acids with the anions of a solid onium compound of the ammonium type, said onium compound having a solubility of less than 0.01 gram in 100 cc. of water at 20° C.

7. A process for recovering acids from aqueous solution comprising effecting exchange of the anions of the acids with the anions of a solid onium compound of the sulfonium type, said onium compound having a solubility of less than 0.01 gram in 100 cc. of water at 20° C.

8. A process for recovering acids from aqueous solution comprising effecting exchange of the anions of the acids with the anions of a solid onium compound of the phosphonium type, said onium compound having a solubility of less than 0.01 gram in 100 cc. of water at 20° C.

9. A process for recovering an acid or acids from aqueous solution comprising effecting exchange of the anions of the acid or acids with the anions of a solid onium compound, said onium compound having a solubility of less than 0.01 gram in 100 cc. of water at 20° C.

10. A process for recovering the anions of a specific acid from an aqueous solution containing several acids which comprises effecting exchange of the anions of said acid with the anions of an insoluble solid onium compound having selective anion exchanging characteristics.

OLIVER M. URBAIN.
WILLIAM R. STEMEN.